United States Patent Office 3,439,607
Patented Apr. 22, 1969

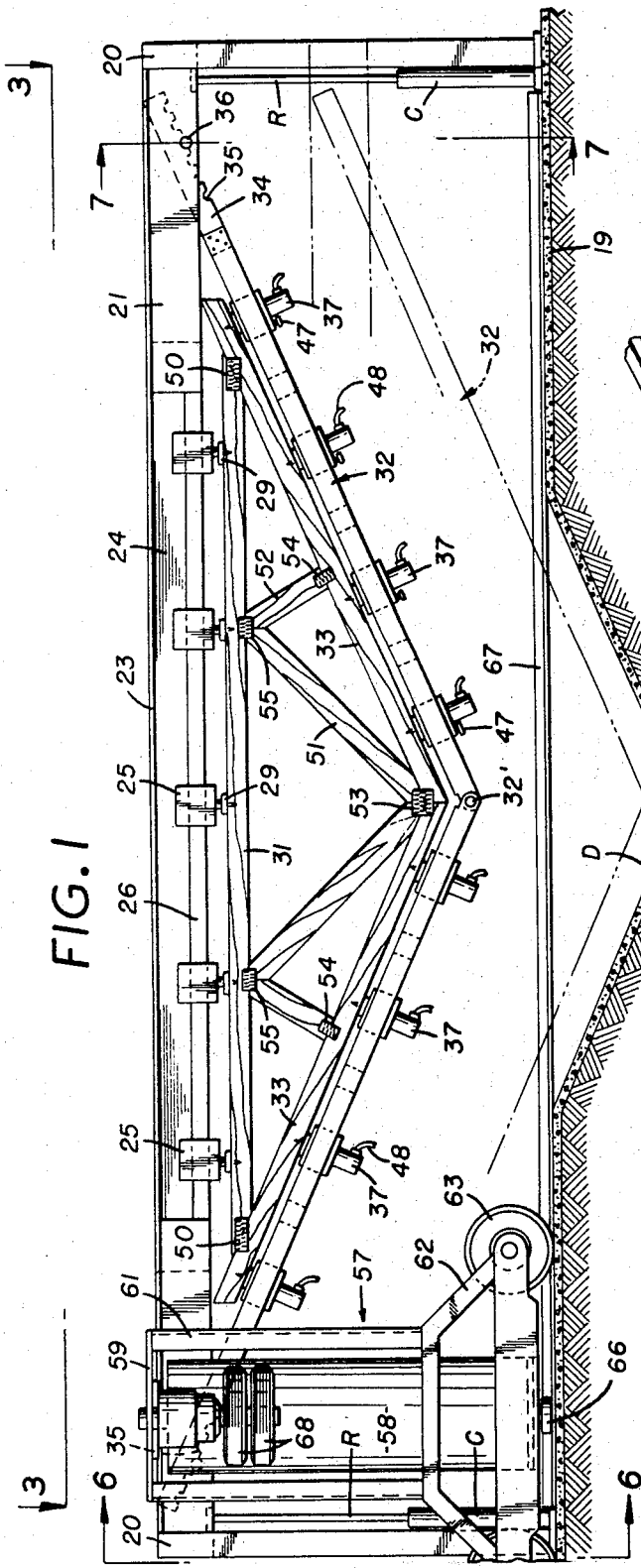
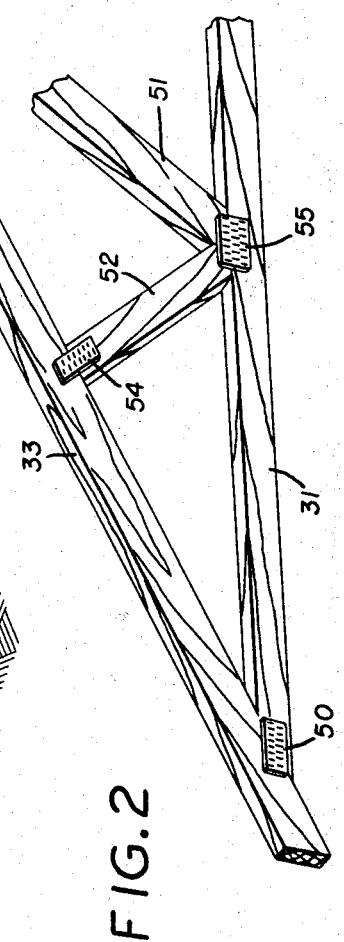

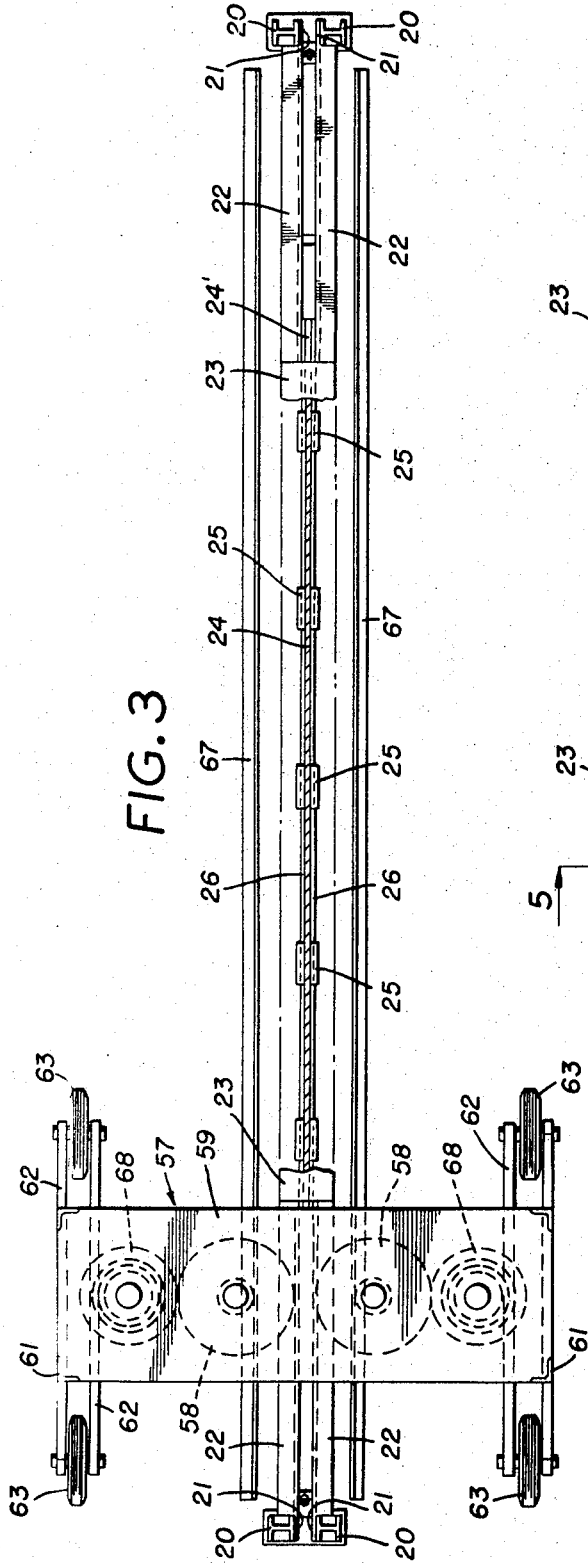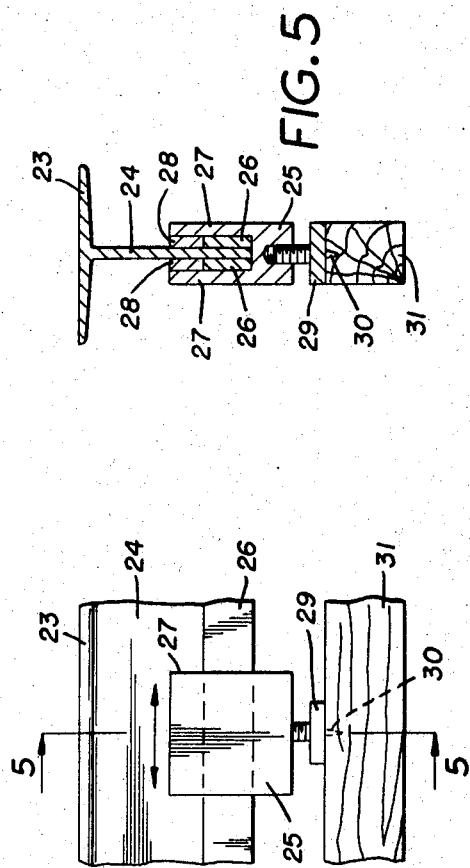

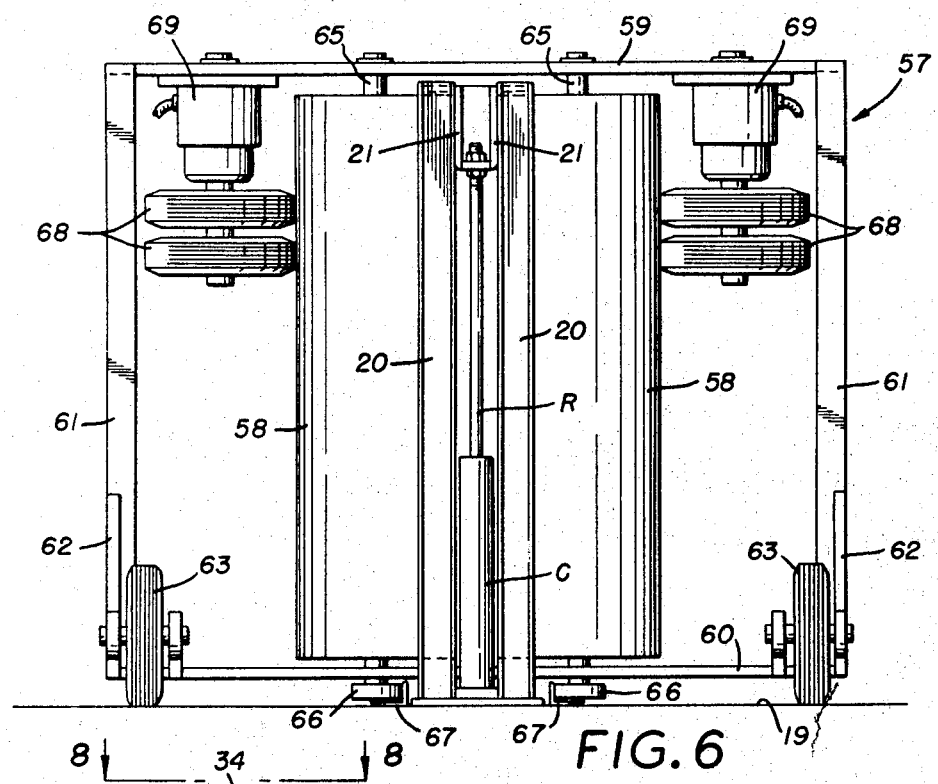
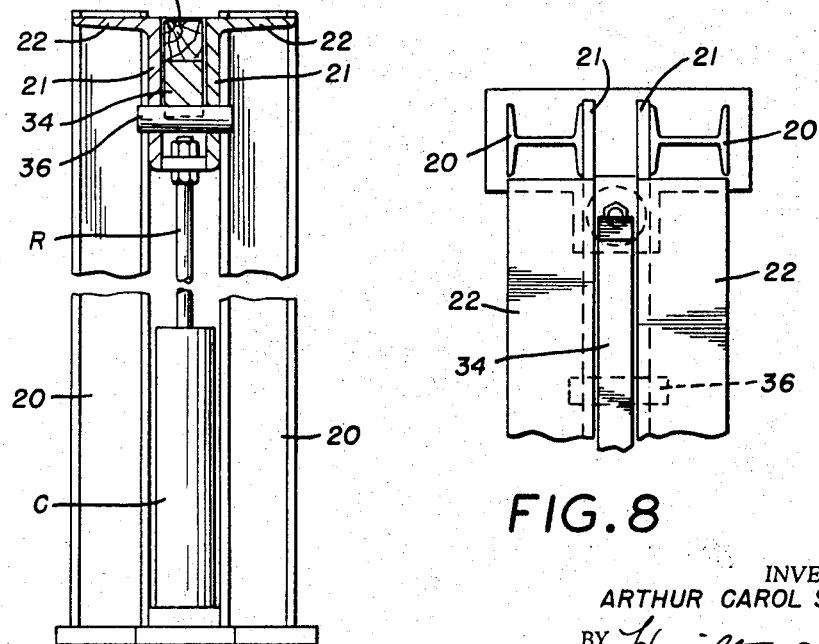
FIG.6
FIG.7
FIG.8
INVENTOR.
ARTHUR CAROL SANFORD
BY Hamilton & Cook
ATTORNEYS

3,439,607
METHOD FOR FABRICATING TRUSSES IN UPRIGHT POSITION
Arthur Carol Sanford, Palm Beach, Fla.
(P.O. Box 1177, Pompano Beach, Fla. 33062)
Original application July 26, 1966, Ser. No. 567,991, now Patent No. 3,390,628, dated July 2, 1968. Divided and this application Feb. 15, 1968, Ser. No. 724,656
Int. Cl. B30b *13/00;* B25c *7/00*
U.S. Cl. 100—35                                      2 Claims

ABSTRACT OF THE DISCLOSURE

The fabrication of triangular trusses having wood components connected together in one plane by toothed connector plates on opposite sides of each joint by supporting the truss components in a vertical plane and then passing a roller press thereover applying pressure to opposite sides of the truss components to fully embed the connector plates therein. The truss is fabricated with the normally bottom chord supported in horizontal position, and the normally top inclined chord components adjustably supported for varying the angle therebetween.

---

This application is a division of my prior copending application Ser. No. 567,991, filed July 26, 1966 now Patent No. 3,390,628 which was issued July 2, 1968.

The present invention relates generally to the fabrication of wooden trusses, and more particularly wooden trusses having their components in one plane and joined together by toothed metal connector plates applied to both sides of each joint between the truss components. The plates have a multiplicity of teeth which are fully embedded into the wood, thus distributing the stress at each joint over the entire areas of the two plates to make a strong joint.

In all prior methods, of which I am aware, for fabricating such trusses, the truss components are laid out on a horizontal table or tables and the plates applied to the joints. The plates may be tacked by hand on one side of the truss, the truss turned over and plates tacked on the other side, and then the plates fully embedded by successively positioning the joints under a stamping press or passing the truss through a pair of horizontal press rolls.

Other conventional methods comprise providing a plurality of simultaneously actuated stamping presses, to apply top and bottom plates to each joint and avoid turning over the entire truss, and my prior Patent No. 3,212,694 shows a truss fabricating machine in which a traveling or gantry roller passes over the top of horizontally assembled truss components and plates to partially set the teeth of the top and bottom plates into the wood, the partially constructed truss being then passed between a pair of horizontal press rolls to fully embed the teeth. Obviously, these conventional methods not only require expensive equipment, especially in respect to a plurality of stamping or rolling presses, but they also require a large amount of floor space for laying out and handling the trusses and having access to various parts thereof. In the method using roller presses, additional floor space is needed for passing the partially constructed trusses through the stationary pair of press rolls to complete the embedment of the plates.

It is an object of the present invention to provide a novel method for fabricating trusses in vertical or upright position so as to require a minimum of floor space and to provide a maximum of accessibility to all parts of the truss.

Another object is to provide a novel method wherein the connector plates are fully embedded by a single pass of press rolls thereover.

A further object is to provide a novel method for vertically suspending assembled truss components in such manner as to permit a pair of press rolls to pass thereover on oppoite sides of the suspended truss and embed connector plates on opposite sides of the joints.

Another object is to provide improved means for adjustably supporting assembled truss components in vertical position in various spans and pitches.

These and other objects are accomplished by the improvements comprising the present invention, as set forth in detail in the following description and accompanying drawings, and defined in the appended claims. Variations and modifications are included within the scope of the claims.

In the drawings:

FIG. 1 is a side elevation of a preferred embodiment of apparatus for carrying out the invention, showing a truss suspended therein in upright position.

FIG. 2 is a fragmentary perspective view of a finished truss.

FIG. 3 is a top plan view as on line 3—3 of FIG. 1.

FIG. 4 is an enlarged elevation, similar to FIG. 1, of one of the backup pads on the top of the apparatus.

FIG. 5 is a sectional view on line 5—5 of FIG. 4.

FIG. 6 is an end elevation on line 6—6 of FIG. 1.

FIG. 7 is a vertical sectional view on line 7—7 of FIG. 1.

FIG. 8 is a plan view on line 8—8 of FIG. 7.

FIG. 15 is a sectional view on line 15—15 of FIG. 13.

FIG. 16 is a sectional view on line 16—16 of FIG. 13.

FIG. 17 is a fragmentary plan view on line 17—17 of FIG. 12.

Figure 9:
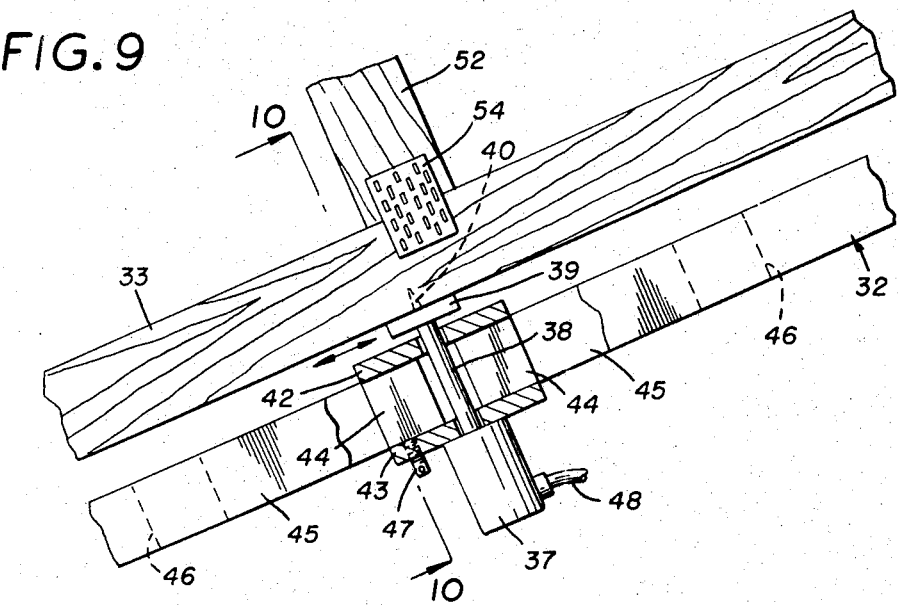
FIG. 9 is an enlarged fragmentary side elevation, partly broken away and in section, showing one of the bottom fluid clamping devices.

Referring to the embodiment of FIGS. 1–11, the suspending frame or jig for supporting the truss components in upright or vertical position preferably comprises vertical end posts 20, which may be of I-beam cross section as shown, resting an a suitable foundation 19. A pair of laterally spaced guide posts 20 is provided at each of the frame, and the inner extended flanges 21 of two back-to-back angles 22 slidably abut the inner flanges of each pair of posts 20. The inner flanges 21 are spaced apart a distance such as to space their outer surfaces 1½ inches apart for a purpose to be described.

A longitudinal T-shaped beam member 23 extends along the top of the frame between the pairs of angles 22, and the ends 24′ of vertical flange 24 of member 23 extend between and are secured to the flanges 21 of angles 22, as by welding. As best shown in FIGS. 4 and 5, backup pads 25 are longitudinally slidably mounted on the beam 23. Preferably, the flange 24 has longitudinal guide rails 26 secured along opposite sides of its bottom portion, and the upwardly extending side flanges 27 of the pad straddle the rails 26 and have inner filler bars 28 resting on the upper edges of rails 26.

Flanged studs 29 are screwed to the bottoms of pads 25 and depend therefrom, each stud having a sharp spike 30 projecting downwardly therefrom, for embedding into and temporarily supporting the bottom chord 31 of a wooden truss being assembled in inverted upright position in the frame. The backup pads 25 are slidable longitudinally along the guide rails 26 to accommodate truss chords of various lengths, and the transverse overall dimension of the pads 25 and flanges 29 is 1½ inches.

The means for vertically adjustably supporting the T-shaped beam member 23 comprises an upright fluid cylinder C adjacent each pair of guide posts 20, having the upper end of its piston rod R secured to the bottom of the angles 22, as shown in FIG. 7, for raising and lowering the beam.

A pair of inclined support bars 32, having their inner ends hinged together at 32' and their outer ends 34 extending between the frame angles 22, is provided for supporting the top chords 33 of the wooden truss being assembled in inverted position. The outer ends 34 of bars 32 have a plurality of notches 35 in their lower edges for adjustably supporting the bars on transverse pins 36 extending between the flanges 21, to accommodate various spans and pitches of trusses.

Figure 10:
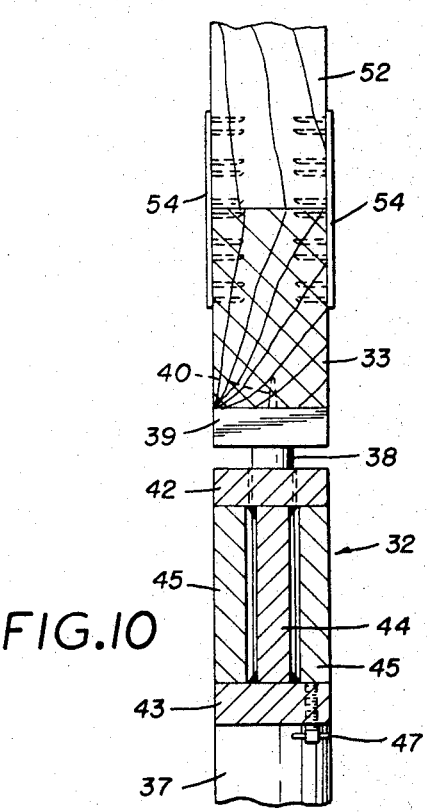
FIG. 10 is a sectional view on line 10—10 of FIG. 9.

As shown in FIGS. 9 and 10, backup fluid cylinders 37 are carried at intervals along the bars 32, the piston 38 of each cylinder having an outer flange 39 and a spike 40 projecting upwardly therefrom. The flanges 39 are adapted for abutting the top chords 33 of a truss being assembled, and the spikes 40 are adapted to penetrate the wood for temporarily holding the chords in place.

The cylinders 37 are mounted on the bars 32 by top and bottom flanges 42 and 43 abutting the bars 32 and connected together by tie plates 44 extending between the side plates 45 of the bars 32. Spacer blocks 46 may be connected between the side plates 45 at intervals between the backup cylinders 37. The backup cylinders 37 are preferably slidably adjustable along the bars 32, and may be held in adjusted position by set screws 47 (FIG. 10). Flexible conduits 48 supply pressure fluid to the cylinders 37.

It is important to note that the overall transverse dimensions of the backup cylinders, the mounting flanges 42 and 43 and abutment flanges 39 are 1½ inches, slightly less than the transverse dimension of the truss chords.

In assembling a truss of 2 x 4 wood components in the novel apparatus, said components being a standard 1⅝ inches in thickness, the supporting bars 32 are positioned with the proper notches 35 engaging pins 36 to give the desired pitch. The supporting piston rods R are preferably lowered to lower the frame to a practical working height, and for this purpose a depression D may be provided in the foundation 19. The chords 33 are then placed on the bars and tacked in place by tapping the chords with a hammer above the spikes 40. The top chord is then tacked in place on the spikes 30 of the upper backup pads 25. The The toothed connector plates 50 may then be tacked to opposite sides of the heel joints.

Next, the pre-cut strut members 51 and 52 are positioned between the upper and lower chords and the connector plates 53, 54 and 55 tacked to opposite sides of the joints. If desired, the strut members 51 and 52 may be pre-assembled in pairs by tacking the plates to opposite sides of the joints before inserting them between the top and bottom chords.

Figure 11:
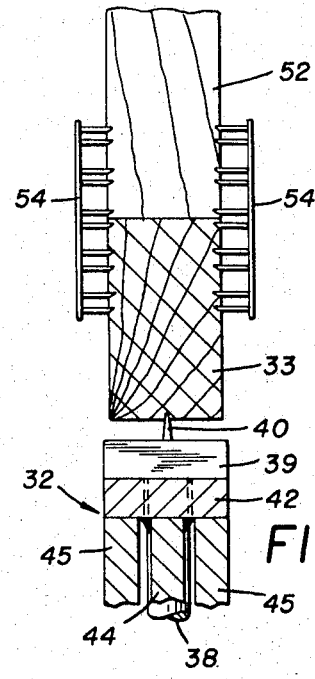
FIG. 11 is a similar view showing the parts before clamping and before the plates are embedded.
Figure 12:
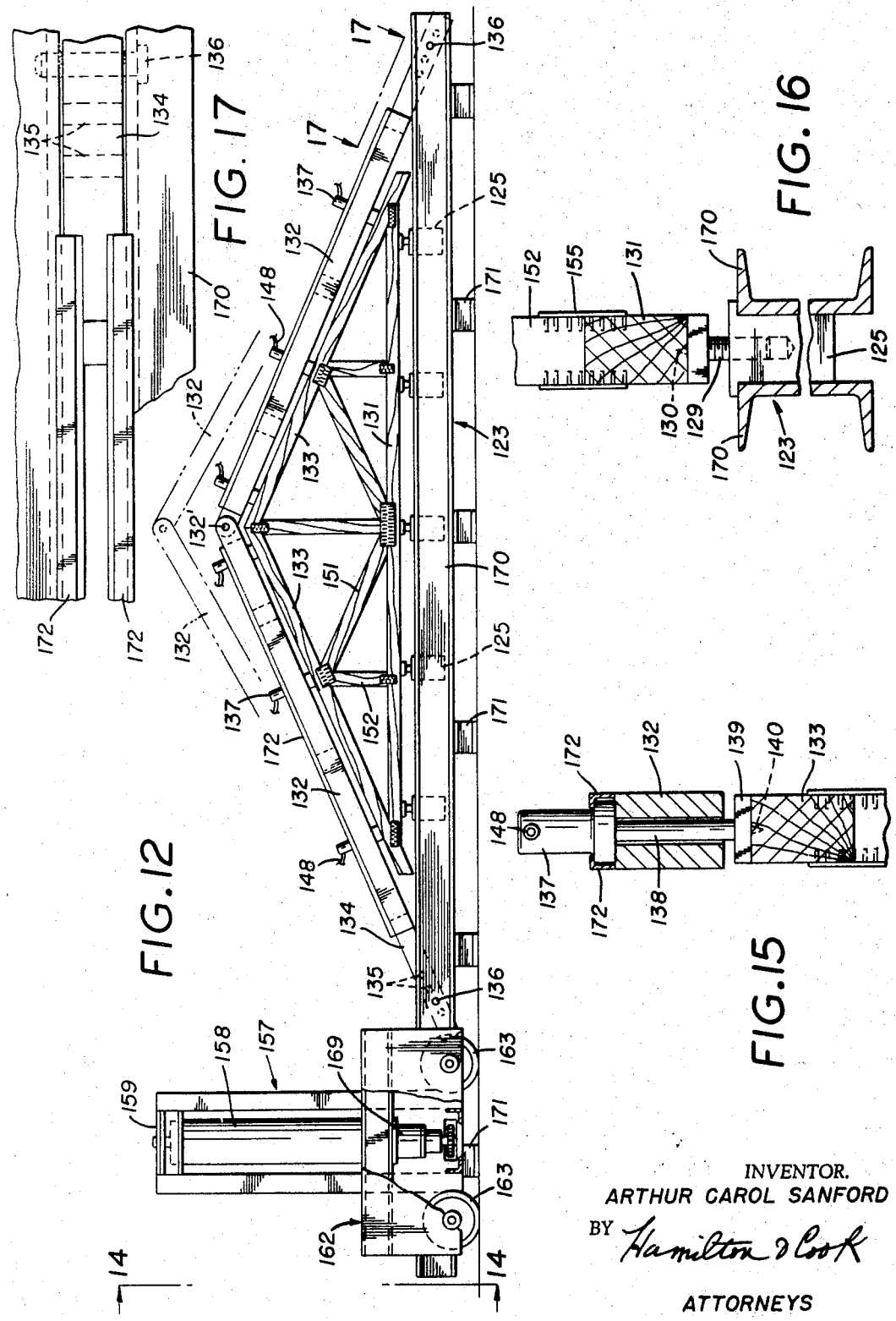
FIG. 12 is a side elevation of another embodiment of apparatus for carrying out the invention, showing an upright truss suspended in inverted position relative to FIG. 1.
Figure 13:
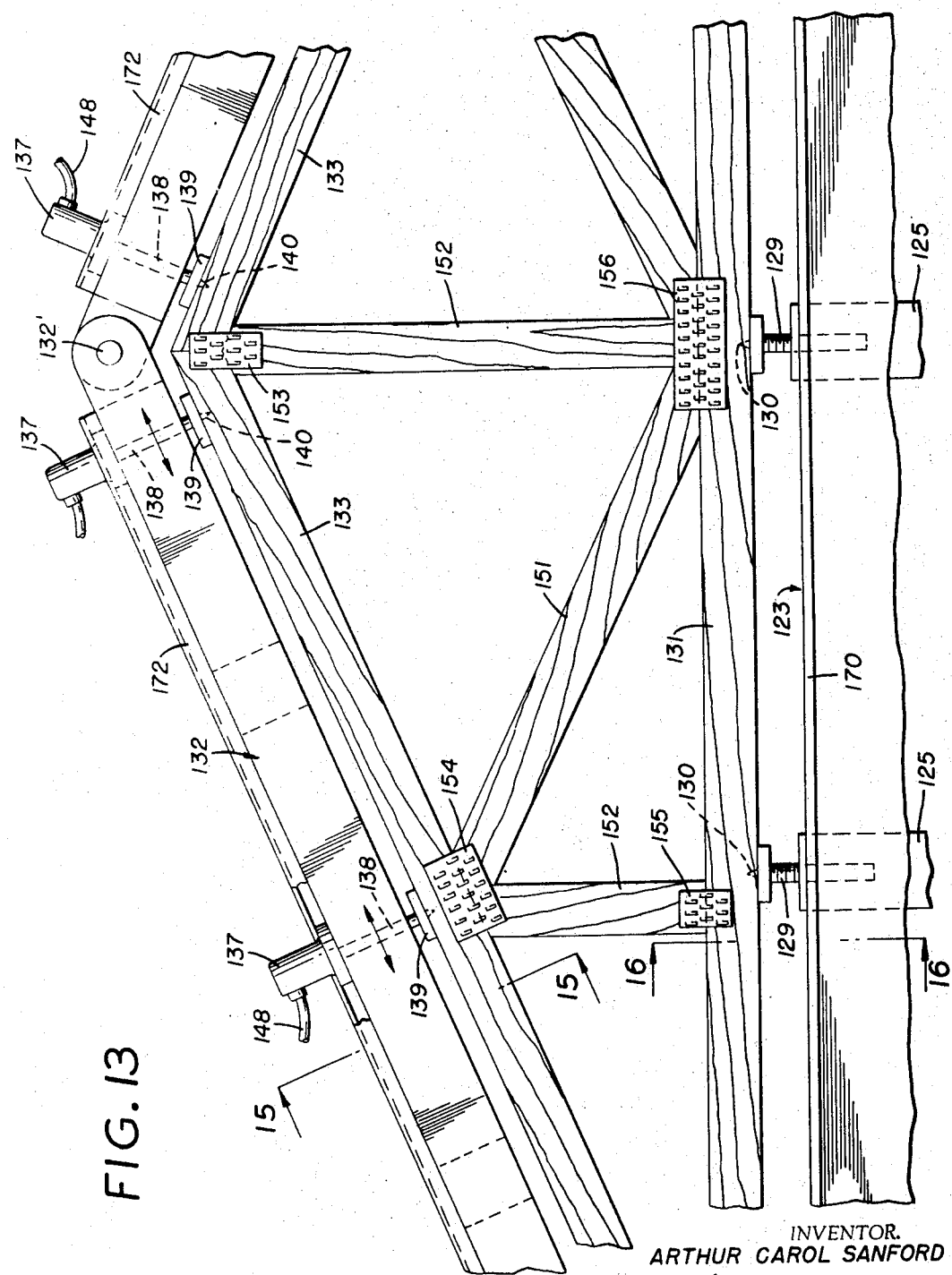
FIG. 13 is an enlarged fragmentary elevation similar to FIG. 12.
Figure 14:
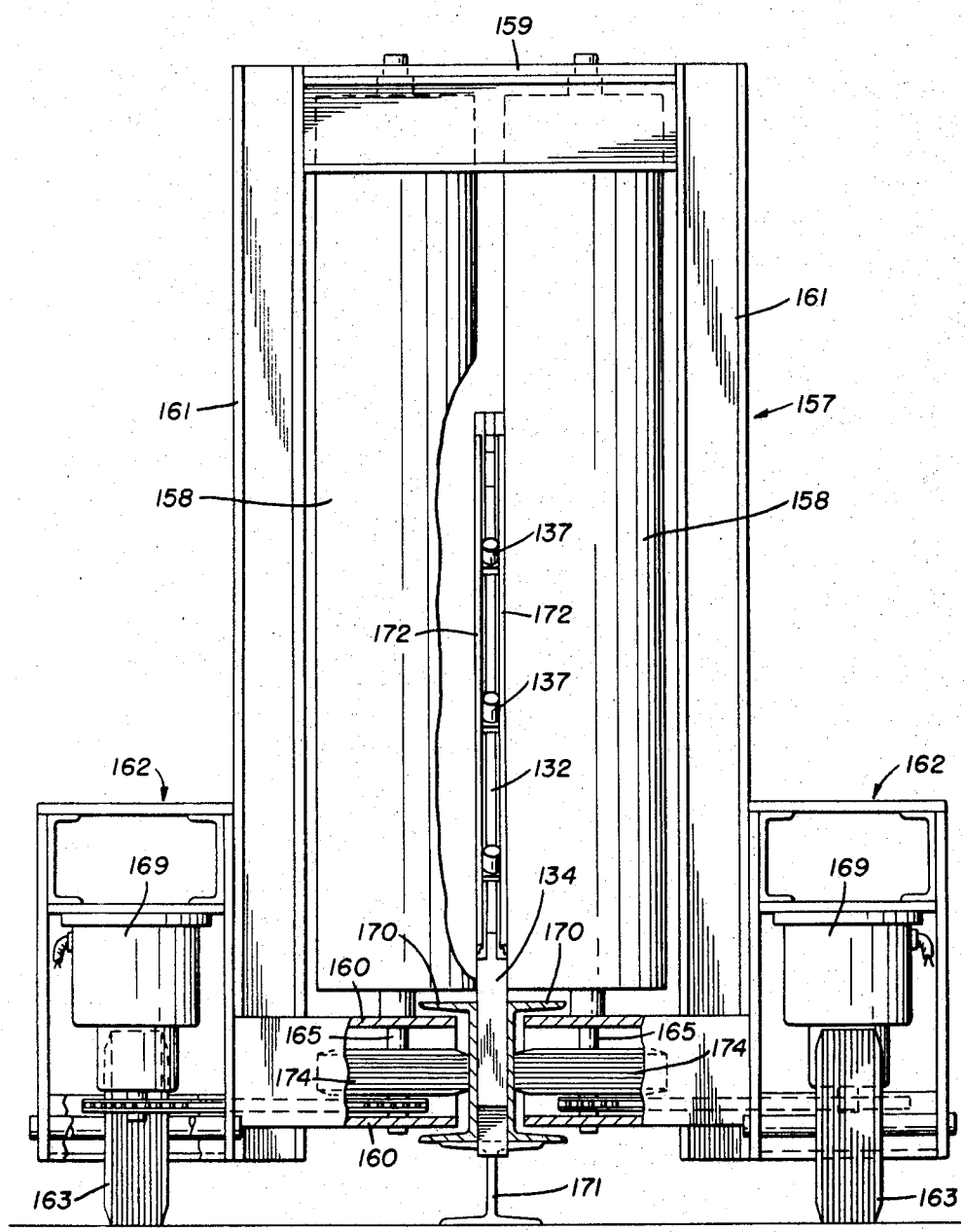
FIG. 14 is an enlarged end elevation on line 14—14 of FIG. 12.

In either event, after all the components are tacked in place in the manner indicated in FIG. 11, piston rods R are actuated to raise the assembled truss, and pistons 38 are actuated to hold the components in tight abutment during the operation of fully embedding the teeth of all the connector plates into the wood components. This is done by means of a traveling or gantry roller press having two rollers straddling the truss and the supporting frame.

The gantry press is indicated as a whole at 57 and has two vertical rollers 58 journaled in the top and bottom plates 59 and 60 connected to upright side bars 61. The frame includes side base frames 62 rollably supported on pairs of wheels 63 spaced longitudinally of the truss frame, and adapted for rolling on the foundation 19.

The shafts 65 of the rollers 58 preferably have horizontal guide rolls 66 at their bottom ends for rolling on the vertical flanges of angle track rails 67. The means for driving the rollers 58 and maintaining inwardly directed pressure thereon as they roll over the truss connector plates preferably comprises pairs of rubber tired drive wheels 68 frictionally engaging the outer peripheries of the rollers 58. Each pair of drive wheels may be mounted on the shaft of an individual drive motor 69 mounted on the top plate 59. The pressure rollers 58 are spaced apart a distance of 1⅝ inches so that as the gantry passes over the assembled truss, the teeth of the connector plates will be embedded into the wood components with the plates in tight abutment with the wood, as indicated in FIG. 10. As previously set forth, all of the supporting frame members over which the rolls pass are 1½ inches in thickness, so as not to interfere with embedding the plates.

As the motors 69 drive the wheel 68 and rotate the rolls 58, the engagement of the rollers 66 with the tracks 67 will propel the gantry roller press longitudinally over the assembled truss, embedding the teeth thereof at all the joints, so that one pass will complete the truss. The cylinders 37 are then actuated to release the top chords, the beam lowered and the truss removed.

In the modified embodiment of the apparatus shown in FIGS. 12–17, the trusses are assembled in right-side-up vertical position rather than inverted as in the embodiment of FIGS. 1–11. The bottom chord 131 of the truss is supported on longitudinally spaced backup pads 125 which are carried on a supporting beam 123 comprising two back-to-back channels 170, spaced apart a distance of 1½ inches and supported on a longitudinal H beam 171 resting on the floor.

The backup pads 125 are longitudinally slidable between channels 170, and have upwardly projecting flanged screw studs 129 with spikes 130 for engaging the truss chord 131. The inclined support bars 132 for supporting the upper chords 133 of the truss have their inner ends hinged together at 132' and their outer ends 134 extending between the channels 170. The outer ends 134 have a plurality of holes 135 for adjustably supporting the bars on transverse pins 136 extending between the channels 170, to accommodate various spans and pitches of trusses.

Backup fluid cylinders 137 are carried on the bars 132, each cylinder being secured to the top of the bars by angle bars 172, and the piston 138 of each cylinder having an outer flange 139 and a spike 140 on its lower end for engaging the truss chords 133. The backup cylinders 137 are preferably slidable along the bars 132 and have flexible conduits 148 for supplying pressure fluid. The overall transverse dimensions of the bars 132 and cylinders 137 are less than the 1⅝ inches transverse dimensions of the truss components.

The gantry roller press, indicated as a whole at 157, has two vertical rollers 158 journaled in top plates 159 and spaced bottom plates 160 connected to upright side frame members 161. Attached to the side members 161 are base frames 162, each carrying a pair of longitudinally spaced wheels 163 for rolling on the floor or foundation.

The shafts 165 of the rollers 158 preferably have horizontal rubber tired drive rolls 174 which engage the webs of channels 170 and are chain-driven by vertical drive motors 169 mounted within the base frames 162. The pressure rollers 158 are spaced apart a distance of 1⅝ inches so that as the gantry press passes over the truss the teeth of the connector plates will be fully embedded into the wood.

The assembly of the truss components 131, 133 and 151 and 152 in the truss frame or jig shown in FIGS. 12–17 is done in much the same way as in the embodiment of FIGS. 1–11, by tapping the chords onto the spikes of the backup pads 125 and backup cylinders 137, and then tacking the other truss components in place with the connector plates 153, 154, 155 and 156. As the motors 169 drive the wheels 174 to rotate the rolls 158, the engagement of the wheels with the channels 170 will propel the gantry carriage longitudinally of the assembled truss and the rollers 158 will fully embed the teeth of the plates at all the joints.

Suitable hoist means (not shown) may be provided for raising and lowering the hinged supporting bars 132, to aid in removing the finished truss.

It will be seen that a novel method for fabricating trusses is provided, requiring a minimum of floor space and affording a maximum amount of accessibility to all parts of the truss during fabrication. Since the assembled truss is supported in upright position with all of the supporting parts having a transverse dimension of less than the truss components, it is possible to fully embed the teeth of all connector plates on opposite sides of the joints with a single pass of a pair of pressure rolls. Moreover, adjustments can be made easily to fabricate trusses of various spans and pitches.

What is claimed is:

1. The method of fabricating trusses having wood components connected together in one plane by toothed connector plates on opposite sides of each truss joint, comprising the steps of:

supporting the bottom chord component in a horizontal position in a vertical plane, supporting the inclined top chord components in the same plane in proper position relative to said bottom chord, inserting the internal truss components in the same plane between said bottom and top chord components and tacking the connector plates on opposite sides of the joints between all the truss components, and simultaneously applying progressive rolling pressure to opposite sides of all the truss components to fully embed the connector plates therein.

2. The method defined in claim 1 in which pressure is applied in said vertical plane to the assembled components to hold them in tight abutment, before applying the rolling pressure.

References Cited

UNITED STATES PATENTS

| 3,212,694 | 10/1965 | Sanford | 227—152 |
| 3,255,943 | 6/1966 | Sanford | 227—152 |

BILLY J. WILHITE, *Primary Examiner.*

U.S. Cl. X.R.

227—152